(12) United States Patent
Miyamoto (10) Patent No.: US 11,740,730 B2
(45) Date of Patent: Aug. 29, 2023

(54) ACTIVE PEN, SENSOR CONTROLLER, AND POSITION DETECTION DEVICE CONFIGURED FOR BIDIRECTION COMMUNICATION USING TIME SLOTS

(71) Applicant: Wacom Co., Ltd., Saitama (JP)

(72) Inventor: Masayuki Miyamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/696,659

(22) Filed: Mar. 16, 2022

(65) Prior Publication Data

US 2022/0300135 A1     Sep. 22, 2022

(30) Foreign Application Priority Data

Mar. 19, 2021   (JP) .................................. 2021-046112

(51) Int. Cl.
| | |
|---|---|
| *G06F 3/041* | (2006.01) |
| *G06F 3/044* | (2006.01) |
| *G06F 3/038* | (2013.01) |
| *G06F 3/0354* | (2013.01) |
| *H04W 72/21* | (2023.01) |
| *H04W 72/23* | (2023.01) |

(52) U.S. Cl.
CPC ........ *G06F 3/04162* (2019.05); *G06F 3/0383* (2013.01); *G06F 3/03545* (2013.01); *G06F 3/0441* (2019.05); *G06F 3/0442* (2019.05); *G06F 3/0446* (2019.05); *H04W 72/21* (2023.01); *H04W 72/23* (2023.01); *G06F 2203/0384* (2013.01); *G06F 2203/04105* (2013.01)

(58) Field of Classification Search
CPC ... G06F 2203/0384; G06F 2203/04105; G06F 3/03545; G06F 3/0383; G06F 3/04162; G06F 3/0441; G06F 3/0442; G06F 3/0446; H04W 72/0413; H04W 72/042
See application file for complete search history.

(56) References Cited

U.S. PATENT DOCUMENTS

| | | | | |
|---|---|---|---|---|
| 10,514,785 | B1 * | 12/2019 | Hara | .................... G06F 3/04162 |
| 10,761,619 | B2 * | 9/2020 | Park | .................... G06F 3/04162 |
| 2017/0192549 | A1 * | 7/2017 | Katayama | ............... G06F 3/041 |
| 2017/0308186 | A1 | 10/2017 | Yamamoto | |

(Continued)

FOREIGN PATENT DOCUMENTS

JP           6059410 B1      1/2017

*Primary Examiner* — Chun-Nan Lin
(74) *Attorney, Agent, or Firm* — Seed IP Law Group LLP (57) ABSTRACT

An active pen communicates with a sensor controller using a series of time slots, to receive uplink signals from and transmit downlink signals to the sensor controller. The series of time slots are determined based on the reception timing, by the active pen, of an uplink signal used as a reference time. The active pen determines whether or not the uplink signal is received and, if yes, the active pen transmits a first downlink signal using a time within the series of time slots. If no, the active pen transmits a second downlink signal using both a time within the series of time slots and a time outside the series of time slots. The second downlink signal is formed by repeating a unit signal that is shorter in duration than each of the series of time slots, to ensure reception by the sensor controller of at least one unit signal.

7 Claims, 9 Drawing Sheets

(56) References Cited

U.S. PATENT DOCUMENTS

| | | | |
|---|---|---|---|
| 2018/0024654 A1* | 1/2018 | Koike | G06F 3/04162 |
| | | | 345/174 |
| 2018/0329526 A1* | 11/2018 | Peretz | G06F 3/03545 |
| 2019/0196642 A1* | 6/2019 | Kong | G06F 3/041662 |
| 2020/0050296 A1* | 2/2020 | Fleck | G06F 3/0383 |
| 2020/0133436 A1* | 4/2020 | Chen | G06F 3/0442 |
| 2021/0200404 A1* | 7/2021 | Kim | G06F 3/0412 |
| 2021/0263601 A1* | 8/2021 | Choi | G06F 3/0443 |

\* cited by examiner

ACTIVE PEN, SENSOR CONTROLLER, AND POSITION DETECTION DEVICE CONFIGURED FOR BIDIRECTION COMMUNICATION USING TIME SLOTS

BACKGROUND

Technical Field

The present disclosure relates to an active pen, a sensor controller, and a position detection device. More particularly, the present disclosure relates to an active pen and a sensor controller that bidirectionally communicate with each other, and to a position detection device including such a sensor controller.

Description of the Related Art

There is known an active pen that is configured to receive an uplink signal from a sensor controller and transmit a downlink signal to the sensor controller. An example of this type of active pen is disclosed in Japanese Patent No. 6059410 (hereinafter, referred to as Patent Document 1).

As is also described in Patent Document 1, the active pen is configured to transmit a downlink signal by using a time slot that is determined based on the reception timing of an uplink signal used as the reference time. Therefore, in order to permit the active pen to transmit the downlink signal, it is necessary that the uplink signal be received.

However, noise such as a signal for driving display pixels may be superimposed on the uplink signal. As a result, the active pen may fail to receive the uplink signal. In such a case, drawing based on pen input may abruptly stop because the active pen becomes unable to transmit the downlink signal. A need exists for an improvement.

BRIEF SUMMARY

The present disclosure has been made in view of the above circumstances to provide an active pen and a sensor controller that are capable of preventing a situation where drawing based on pen input is stopped due to the active pen being unable to receive an uplink signal.

According to a first aspect of the present disclosure, there is provided an active pen that communicates with a sensor controller by using a series of time slots, the series of time slots being determined based on a reception timing of an uplink signal set as a reference time. The active pen determines whether or not the uplink signal is received. If the uplink signal is determined to have been received, the active pen transmits a first downlink signal by using a time within the series of time slots. If the uplink signal is determined to have not been received, the active pen transmits a second downlink signal by using both a time within the series of time slots and a time outside the series of time slots, wherein the second downlink signal is formed by repeating a unit signal that is shorter in duration than each of the series of time slots.

According to the first aspect of the present disclosure, there is also provided a sensor controller that communicates with the active pen according to the first aspect of the present disclosure. The sensor controller determines whether or not a gap is included in a signal detected within one of the series of time slots. If the gap is determined to be included, the sensor controller demodulates the detected signal as the first downlink signal. If the gap is determined to be not included, the sensor controller demodulates the detected signal as the second downlink signal.

According to a second aspect of the present disclosure, there is provided an active pen that communicates with a sensor controller. The active pen includes an electrode and a coil, a transmission circuit that transmits a downlink signal to the sensor controller by changing a potential of the electrode, and a reception circuit that receives an uplink signal transmitted from the sensor controller by detecting an induced current generated in the coil.

According to the second aspect of the present disclosure, there is also provided a position detection device that detects a position of an active pen on a touch surface. The position detection device includes at least one loop coil that is disposed in the touch surface, a plurality of sensor electrodes that are disposed in the touch surface, and a sensor controller that supplies an uplink signal to each of the at least one loop coil to transmit the uplink signal to the active pen and detects a change in a potential of each of the plurality of sensor electrodes to receive a downlink signal transmitted from the active pen.

Even when the active pen fails to receive an uplink signal and to determine the temporal position of a time slot, the first aspect of the present disclosure enables the active pen to continuously transmit a downlink signal. Therefore, the first aspect of the present disclosure prevents a situation where drawing based on pen input is stopped due to a failure to receive the uplink signal.

According to the second aspect of the present disclosure, an uplink signal can be transmitted by an electromagnetic induction method. The electromagnetic induction method is less susceptible to noise than a capacitive coupling method. Therefore, the second aspect of the present disclosure prevents a situation where drawing based on pen input is stopped due to a failure to receive the uplink signal.

DETAILED DESCRIPTION

Preferred embodiments of the present disclosure will now be described in detail with reference to the accompanying drawings.

Figure 1:
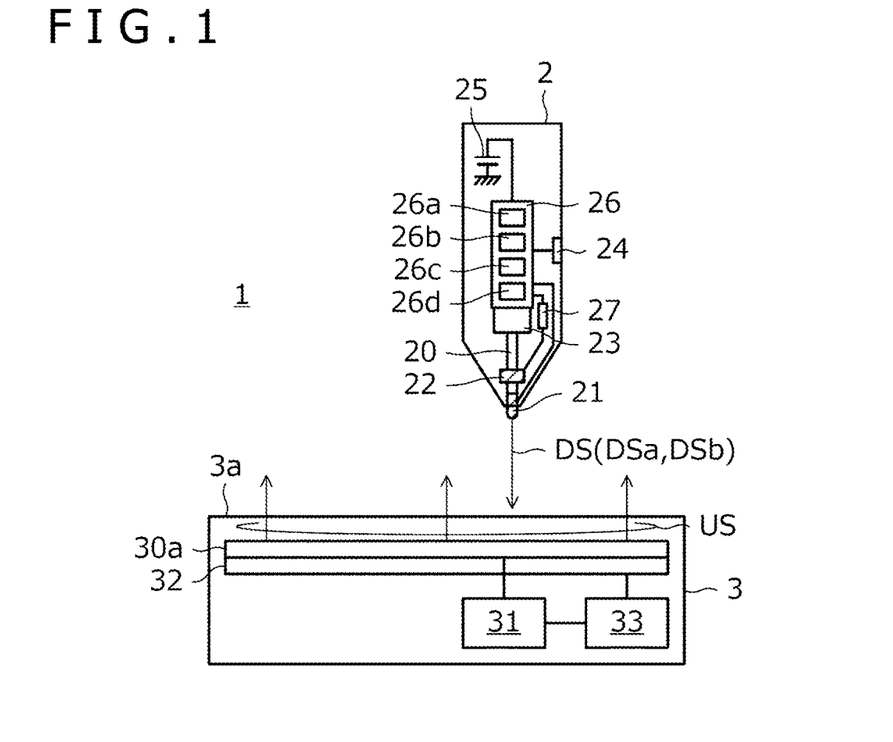
FIG. 1 is a diagram illustrating a configuration of a position detection system according to a first embodiment of the present disclosure.

FIG. 1 is a diagram illustrating a configuration of a position detection system 1 according to a first embodiment of the present disclosure. As depicted in FIG. 1, the position detection system 1 includes an active pen 2 and an electronic apparatus 3. The electronic apparatus 3 is a position detection device for detecting the active pen 2.

The electronic apparatus 3 is, for example, a tablet computer, a digitizer, or other computers having a touch surface 3a. The electronic apparatus 3 includes a sensor 30a, a sensor controller 31, a display 32, and a host processor 33. The sensor 30a is disposed directly below the touch surface 3a. The sensor controller 31 is connected to the sensor 30a. The display 32 is superimposed over the sensor 30a. The host processor 33 controls these and other components of the electronic apparatus 3.

The host processor 33 is a central processing unit in the electronic apparatus 3, and configured to read various programs from a memory (not depicted) and execute the read programs. The programs executed in this manner include an operating system of the electronic apparatus 3 and various applications such as a drawing application. The drawing application is a program that performs a process of generating digital ink on the basis of position information and data supplied from the sensor controller 31 and storing the generated digital ink in a memory included in the electronic apparatus 3, and performs a process of rendering the generated digital ink, generating a video signal indicating the result of rendering, and supplying the generated video signal to the display 32. The display 32 is a device that includes, for example, a liquid-crystal display or an organic electroluminescent (EL) display, and displays a video signal supplied from the host processor 33.

The sensor controller 31 is an integrated circuit that has a function of deriving the position of the active pen 2 on the touch surface 3a by bidirectionally communicating with the active pen 2 through the sensor 30a, acquiring data from the active pen 2, and supplying the derived position and the acquired data to the host processor 33 accordingly. In the present embodiment, the communication between the sensor controller 31 and the active pen 2 is bidirectionally established by a capacitive coupling method through a capacitance formed between electrodes of the electronic apparatus 3 (sensor electrodes 30x and 30y which will be described later) and electrodes of the active pen 2 (a pen tip electrode 21 and a ring electrode 22 which will be described later). A signal transmitted from the sensor controller 31 to the active pen 2 is hereinafter referred to as an uplink signal US, and a signal transmitted from the active pen 2 to the sensor controller 31 is hereinafter referred to as a downlink signal DS.

Figure 2:
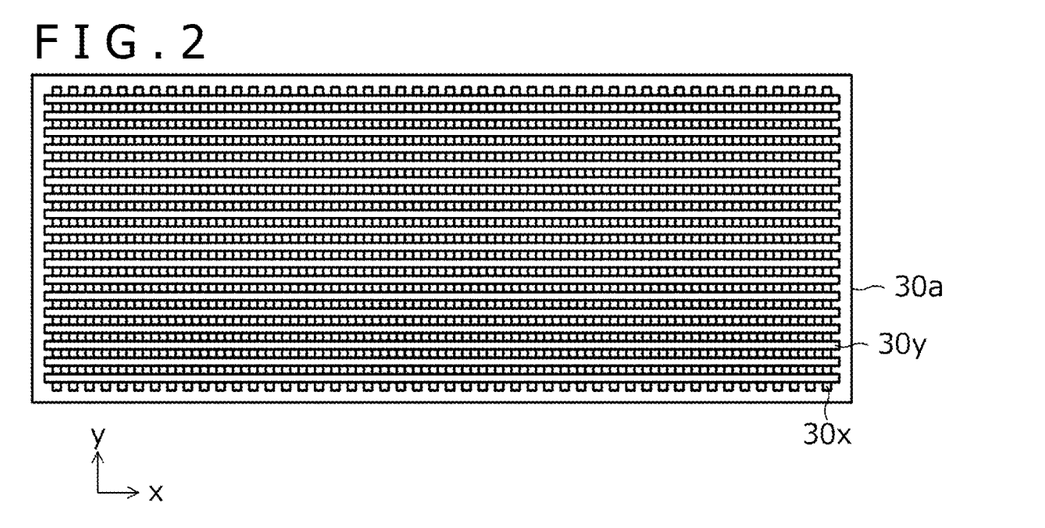
FIG. 2 is a plan view of a sensor depicted in FIG. 1.

FIG. 2 is a plan view of the sensor 30a. As depicted in FIG. 2, the sensor 30a includes a plurality of sensor electrodes 30x and a plurality of sensor electrodes 30y, which are disposed in the touch surface 3a. The plurality of sensor electrodes 30x are conductors that are extended in the y direction depicted in FIG. 2, and are placed side by side at equal intervals in the x direction depicted in FIG. 2. Meanwhile, the plurality of sensor electrodes 30y are conductors that are extended in the x direction depicted in FIG. 2, and are placed side by side at equal intervals in the y direction depicted in FIG. 2. The sensor controller 31 transmits the uplink signal US to the active pen 2 by changing the potentials of either the plurality of sensor electrodes 30x or the plurality of sensor electrodes 30y. Further, the sensor controller 31 receives the downlink signal DS transmitted from the active pen 2 by detecting a change in the potential of each of the plurality of sensor electrodes 30x and the plurality of sensor electrodes 30y.

Here, the electronic apparatus 3 is what is generally called an "in-cell" position detection device, and either the plurality of sensor electrodes 30x or the plurality of sensor electrodes 30y, which are included in the sensor 30a, double as common electrodes of the display 32 (electrodes for commonly supplying a ground potential to all pixels). Therefore, the sensor controller 31 is unable to use the sensor 30a to transmit the uplink signal US and receive the downlink signal DS at a timing of driving the pixels in the display 32. Consequently, the sensor controller 31 acquires the timing for driving the pixels in the display 32 from the host processor 33, transmits the uplink signal US at regular intervals determined by pixel drive intervals, sets a plurality of time slots corresponding to the individual pixel drive intervals as transmission intervals of the uplink signal US, and receives the downlink signal DS from the active pen 2 by using a time within each time slot.

The uplink signal US is a signal modulated by a command including an instruction for the active pen 2, and is formed by a pulse wave (rectangular wave) that is obtained by spreading each transmission bit using a predetermined chip sequence (spread code). The chip length of the predetermined chip sequence (the pulse period of the uplink signal US) is, for example, 1 or 2 μsec, and the edge period (the rise or fall period) is, for example, 10 nsec.

The downlink signal DS is a position signal for causing the sensor controller 31 to detect the position of the active pen 2, or is a data signal modulated by data (a pen pressure value, switch information, etc., to be described later) that the uplink signal US instructs the active pen 2 to transmit. However, the transmission of the position signal is not essential. The sensor controller 31 is able to detect the position of the active pen 2 from the data signal as well. A specific configuration of the downlink signal DS varies depending on whether or not the uplink signal US has been received by the active pen 2 immediately before the downlink signal DS is transmitted. The downlink signal DS transmitted in a case where the uplink signal US has been received immediately before the downlink signal DS is transmitted is hereinafter referred to as a downlink signal DSa (first downlink signal), and the downlink signal DS transmitted in a case where the uplink signal US has not been received immediately before the downlink signal DS is transmitted is hereinafter referred to as a downlink signal DSb (second downlink signal).

The downlink signal DSa is dividedly transmitted by using each of a series of time slots that are set by the sensor controller 31. The active pen 2 determines the temporal positions of the series of time slots using the reception timing of the immediately preceding uplink signal US as the reference time, and transmits the downlink signal DSa by using a time within each of the determined time slots.

Here, the active pen 2 is configured so as to arrange (include) a pen pressure value four times in the downlink signal DSa transmitted during one transmission interval UpIntv. The arranged pen pressure value is the latest pen pressure value supplied from a pressure sensor 23 at the time of transmission of the pen pressure value. This ensures that the pen pressure value is transmitted at a higher temporal resolution. Therefore, the host processor 33 is able to render more realistic drawing.

The downlink signal DSb is a signal formed by repeating a unit signal that is shorter in duration than each of the time slots. A specific configuration of the downlink signal DSb will be described later. It is noted that the unit signal is a data signal modulated by predetermined data.

When the active pen 2 fails to receive the immediately preceding uplink signal US, the active pen 2 is unable to determine the temporal positions of the series of time slots. As a result, the downlink signal DSb is transmitted by using both a time within the series of time slots and a time outside the series of time slots. As a result the sensor controller 31 is unable to receive a portion of the downlink signal DSb (a portion of the downlink signal DSb that is transmitted at a time outside the series of time slots). However, when the duration of the unit signal is set as described above, at least one unit signal can be received by the sensor controller 31. Consequently, even when the active pen 2 cannot determine the temporal positions of the series of time slots, the active pen 2 can still transmit the downlink signal DS to the sensor controller 31.

Physically, the downlink signals DSa and DSb are each formed of a signal based on a pulse wave (rectangular wave) or a sine wave. The pulse period and the edge period of the downlink signals DSa and DSb based on a pulse wave are significantly longer than those of the uplink signal US. More specifically, the pulse period is, for example, 4 to 40 μsec, and the edge period is, for example, 100 nsec to 5 μsec. Meanwhile, the frequency of the downlink signals DSa and DSb based on a sine wave is, for example, 1.8 MHz. It may be preferable that DQPSK or DBPSK be used as a modulation method for a carrier wave, that is, a pulse wave or a sine wave. Which of these modulation methods is used is predetermined based on the standard to be complied with.

Returning to FIG. 1, the active pen 2 includes a core (central) body 20, the pen tip electrode 21 (first electrode), the ring electrode 22 (second electrode), the pressure sensor 23, a side switch 24, a battery 25, an integrated circuit 26, and a stop filter 27. The core body 20 is a member that forms a pen shaft of the active pen 2. The tip of the core body 20 forms a pen tip of the active pen 2, and the end of the core body 20 abuts on the pressure sensor 23. The pen tip electrode 21 and the ring electrode 22 are conductors disposed at different positions. The pen tip electrode 21 is disposed at the pen tip of the active pen 2. The ring electrode 22 is positioned closer to the middle portion of the active pen 2 than the pen tip electrode 21 and is disposed to surround the core body 20.

The pressure sensor 23 is a sensor that detects a pressure applied to the tip of the core body 20. The pressure detected by the pressure sensor 23 is supplied to the integrated circuit 26 as a pen pressure value of, for example, 12 bits. The side switch 24 is a pushbutton switch attached to the surface of the active pen 2, and can be turned on and off by a user. The operating status (on or off state) of the side switch 24 is supplied to the integrated circuit 26 as switch information of, for example, 2 bits. The battery 25 plays a role of supplying electrical power necessary for the operation of the integrated circuit 26.

The integrated circuit 26 is formed by various circuits including a booster circuit 26a, a transmission circuit 26b, a reception circuit 26c, and a processing circuit 26d. The transmission circuit 26b is connected to the pen tip electrode 21, and plays a role of transmitting the downlink signal DS when the booster circuit 26a is used to change the potential of the pen tip electrode 21. The reception circuit 26c is connected to the ring electrode 22. Upon detecting a change in the potential of the ring electrode 22, the reception circuit 26c plays a role of receiving the uplink signal US.

The processing circuit 26d performs processing based on the uplink signal US received by the reception circuit 26c. The processing includes a process of determining the temporal positions of the series of time slots based on the reception timing of the uplink signal US used as the reference time, a process of generating the downlink signal DS based on a command from the sensor controller 31 and transmitting the generated downlink signal DS to the transmission circuit 26b, and a process of causing the reception circuit 26c to receive the next uplink signal US.

Figure 3:
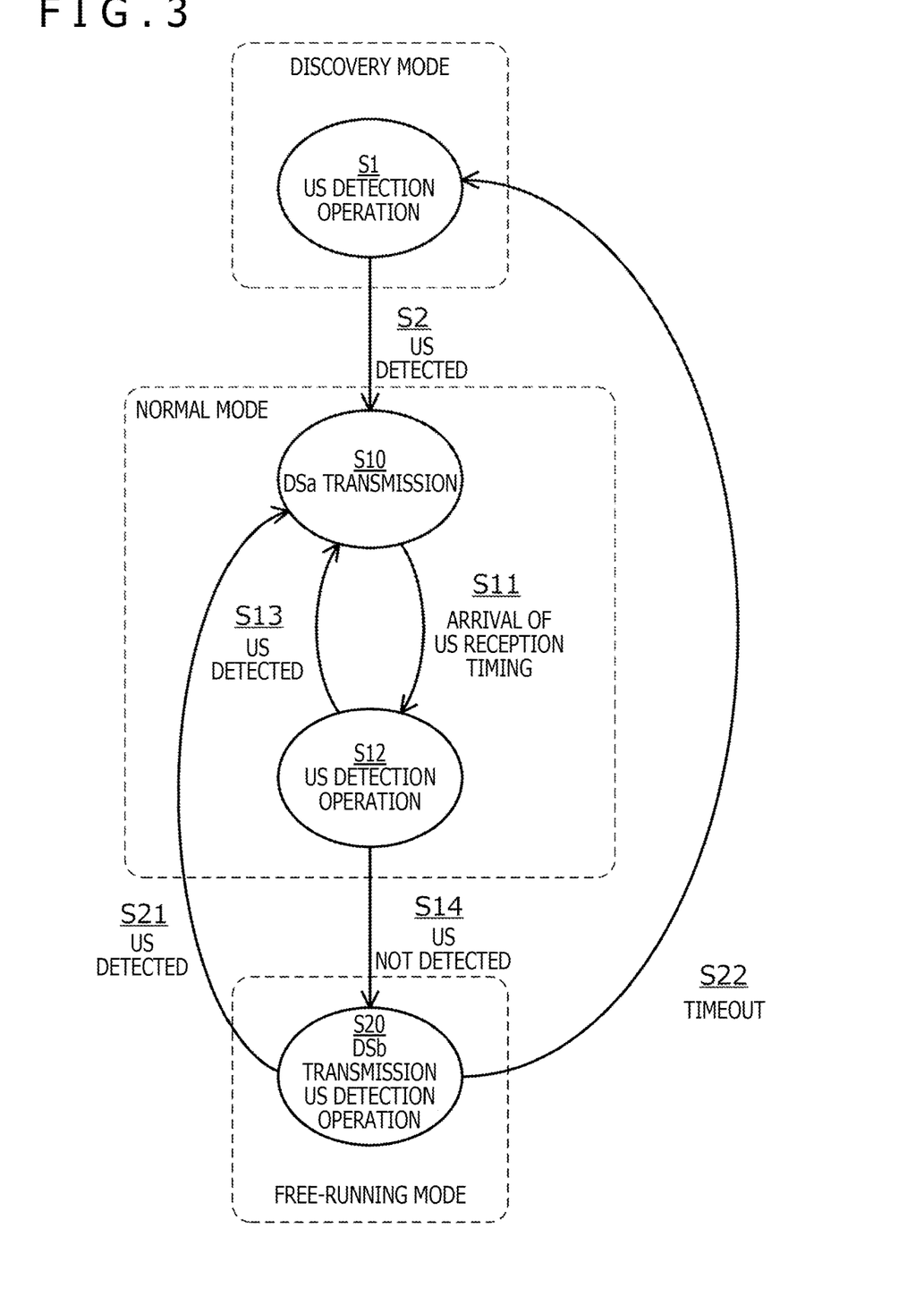
FIG. 3 is a state transition diagram of a processing circuit depicted in FIG. 1.

FIG. 3 is a state transition diagram of the processing circuit 26d. As depicted in FIG. 3, the processing circuit 26d operates in a discovery mode, a normal mode, or a free-running mode (an autonomous mode). The processing circuit 26d is initially in the discovery mode. In the discovery mode, the processing circuit 26d causes the reception circuit 26c to continuously or intermittently perform an operation of detecting the uplink signal US (step S1).

In a case where the uplink signal US is detected as a result of the detection operation in step S1, the processing circuit 26d enters the normal mode (step S2). Then, the processing circuit 26d determines the temporal positions of the series of time slots based on the reception timing of the uplink signal US used as the reference time, and causes the transmission circuit 26b to transmit the downlink signal DSa by using a time within the series of time slots (step S10). Further, in a case where the reception timing of the next uplink signal US arrives (step S11), the processing circuit 26d causes the reception circuit 26c to perform an operation of detecting the next uplink signal US (step S12). In a case where the next uplink signal US is detected as a result of the detection operation in step S12 (step S13), the processing circuit 26d determines again the temporal positions of the series of time slots based on the reception timing of the detected uplink signal US used as the reference time, and repeats step S10.

Meanwhile, in a case where the uplink signal US is not detected as a result of the detection operation in step S12, the processing circuit 26d enters the free-running mode (step S14). In the free-running mode, the processing circuit 26d not only generates the downlink signal DSb and causes the transmission circuit 26b to transmit the generated downlink signal DSb, but also, in parallel, causes the reception circuit 26c to perform an operation of detecting the uplink signal US (step S20). This parallel processing is implemented by the stop filter 27 depicted in FIG. 1 and will be described in detail later. In a case where the uplink signal US is detected in step S20, the processing circuit 26d returns to the normal model (step S21). Then, the processing circuit 26d determines the temporal positions of the series of time slots based on the reception timing of the uplink signal US used as the reference time, and repeats step S10. Meanwhile, in a case where the uplink signal US remains undetected for a predetermined period of time, the processing circuit 26d returns to the discovery mode to continue its processing (step S22). In this case, the transmission of the downlink signal DSb comes to a stop.

Returning to FIG. 1, the stop filter 27 is a filter circuit that is inserted between the ring electrode 22 and the integrated circuit 26 in order to simultaneously permit the ring electrode 22 to detect the uplink signal US and permit the pen tip electrode 21 to transmit the downlink signal DSb. More specifically, since the booster circuit 26a, which is used to transmit the downlink signal DSb, increases the potential by up to 18 to 20V, the reception circuit 26c is also affected by a change in the potential of the pen tip electrode 21, which is caused by the transmission of the downlink signal DSb. As a result, the downlink signal DSb is superimposed on the potential of the uplink signal US detected by the reception circuit 26c. This makes it difficult to detect the uplink signal US simultaneously with the transmission of the downlink signal DSb. In a case where the active pen 2 is hovering (the pen tip is separated from the touch surface 3a) and the ring electrode 22 is far from the sensor 30a, the reception strength of the uplink signal US is reduced. This makes it further difficult to detect the uplink signal US. The stop filter 27 blocks the change in the potential of the pen tip electrode 21, which is caused by the transmission of the downlink signal DSb, from affecting the potential of the uplink signal US detected by the reception circuit 26c in the integrated circuit 26, and thus allows for detecting the uplink signal US using the ring electrode 22 and simultaneously transmitting the downlink signal DSb using the pen tip electrode 21.

The specific configuration of the stop filter 27 may vary according to each application. For example, in a case where the downlink signal DSb includes a signal based on a sine wave, the stop filter 27 may be formed by a band-stop filter (notch filter) that blocks a specific frequency band including the frequency of the downlink signal DSb. Meanwhile, in a case where the downlink signal DSb includes a pulse wave, the stop filter 27 may be formed by a bypass filter that passes a pulse wave included in the uplink signal US and blocks a pulse wave included in the downlink signal DSb. An alternative is to arrange a mute circuit in a stage following the bypass filter in order to mute the edge of the downlink signal DSb. Another alternative is to remove the downlink signal DSb from a signal arriving at the ring electrode 22 by configuring the stop filter 27 using a combination of a gain circuit and a differential circuit or a combination of a finite impulse response (FIR) filter, a subtractor, and a feedback circuit.

Figure 4:
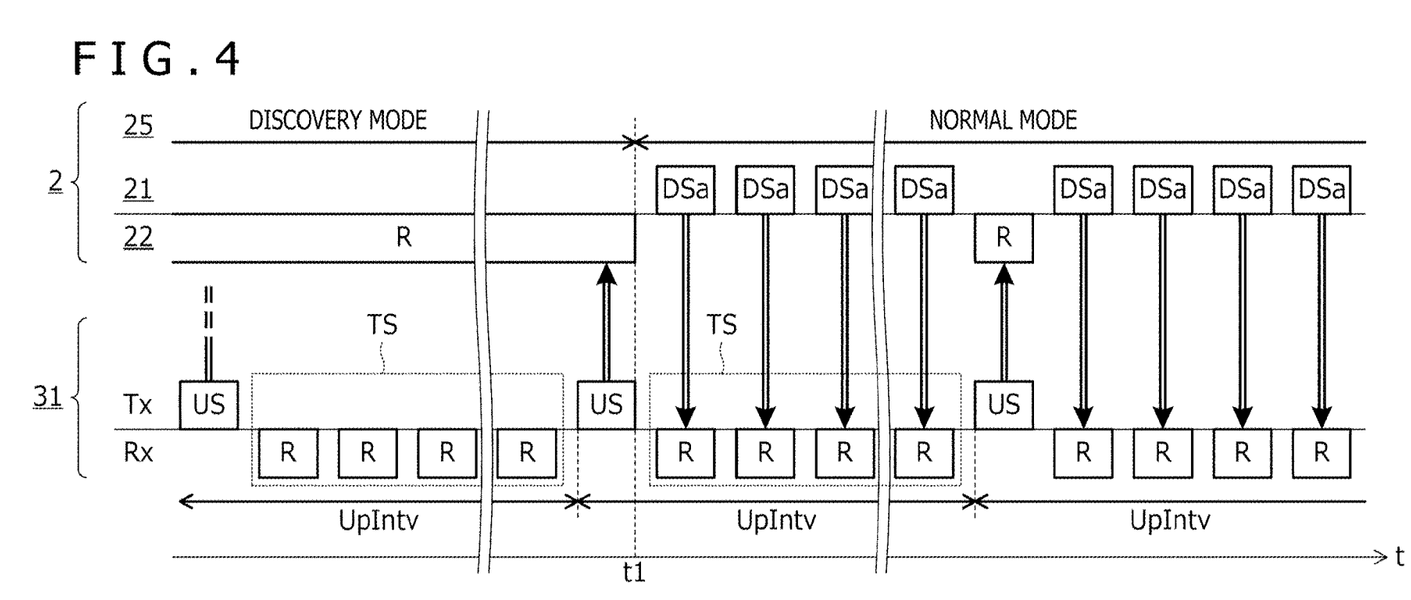
FIG. 4 is a diagram illustrating operations of an active pen and operations of a sensor controller.
Figure 5:
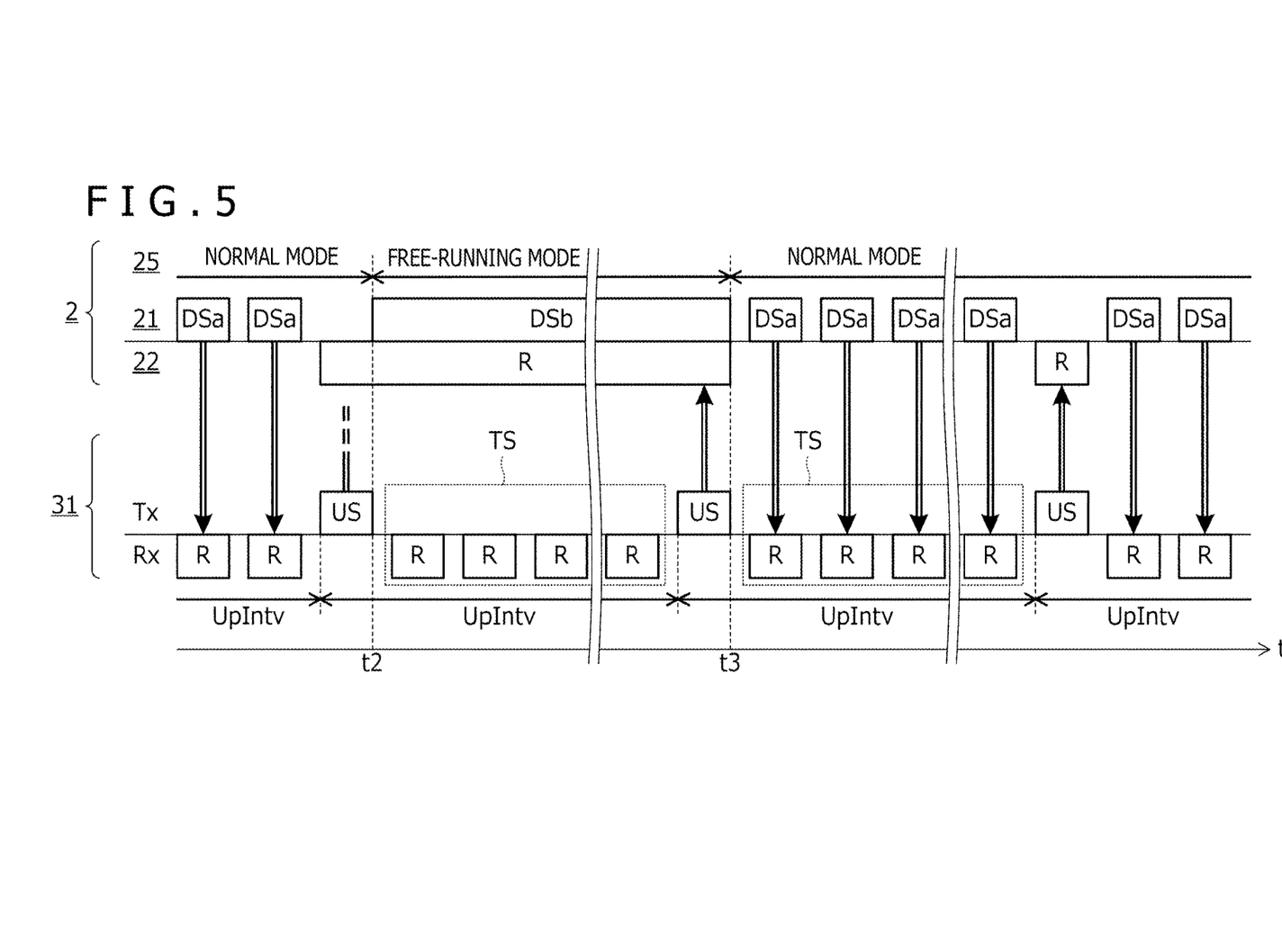
FIG. 5 is a diagram illustrating the operations of the active pen and the operations of the sensor controller.

FIGS. 4 and 5 are diagrams illustrating operations of the active pen 2 and operations of the sensor controller 31. The operations of the active pen 2 and sensor controller 31 according to the present embodiment will now be described in more detail with reference to FIGS. 4 and 5.

The horizontal axes of FIGS. 4 and 5 represent time. Referring initially to FIG. 4, the active pen 2 in the discovery mode continuously or intermittently performs an operation of detecting the uplink signal US that has arrived at the ring electrode 22. Meanwhile, the sensor controller 31 transmits the uplink signal US at regular intervals Upintv determined by the pixel drive intervals in the display 32, sets a series of time slots TS corresponding to the individual pixel drive intervals in the display 32 as transmission intervals of the uplink signal US, and performs an operation of detecting the downlink signal DS within each of the time slots TS.

Upon successfully receiving the uplink signal US at time t1, the active pen 2 enters the normal mode, determines the temporal positions of the series of time slots TS based on the reception timing of the uplink signal US used as the reference time, acquires a command transmitted from the sensor controller 31 by demodulating the received uplink signal US, and generates the downlink signal DSa according to the acquired command. Then, the active pen 2 transmits the generated downlink signal DSa by using a time within each of the determined time slots TS. The sensor controller 31, which only uses the time within the series of time slots TS to receive the downlink signal DS, is thus able to properly receive the downlink signal DSa.

Referring next to FIG. 5, the active pen 2 detects that it has failed to receive the uplink signal US by detecting that the uplink signal US has not been received at time t2 at which the uplink signal US should be received. Then, the active pen 2 enters the free-running mode and generates the downlink signal DSb that is formed by repeating a unit signal shorter in duration than each of the time slots TS. Next, the active pen 2 transmits the generated downlink signal DSb by using both a time within the series of time slots TS and a time outside the series of time slots TS. Though the sensor controller 31 receives the downlink signal DS using only the time within the series of time slots TS, because the downlink signal DSb is formed by repeating the unit signal shorter in duration than each of the time slots TS as described above, the sensor controller 31 is able to receive at least one unit signal.

Next, upon successfully receiving the uplink signal US at time t3, the active pen 2 returns to the normal mode. In the normal mode, the active pen 2 and the sensor controller 31 perform the above-described operations. Subsequently, the active pen 2 similarly changes the operating mode depending on whether or not the uplink signal US is successively received, and accordingly changes the configuration of the downlink signal DS to be transmitted. Consequently, the active pen 2 according to the present embodiment prevents a situation where drawing based on pen input is stopped due to a failure to receive the uplink signal US.

Figure 6A:
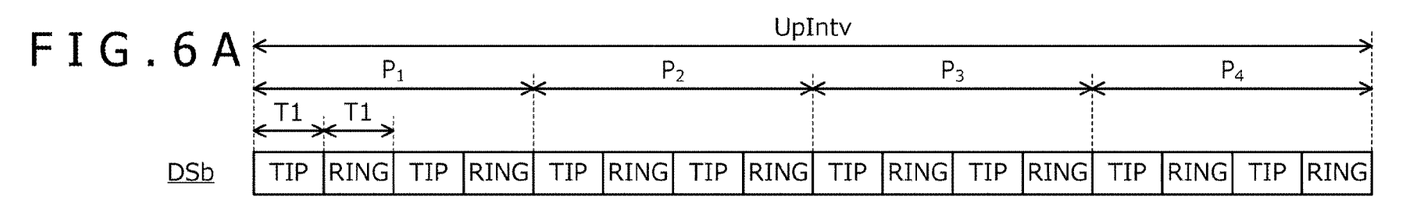
FIG. 6A is a diagram illustrating a configuration of a downlink signal depicted in FIG. 5.

FIG. 6A is a diagram illustrating a configuration of the downlink signal DSb. As depicted in FIG. 6A, the downlink signal DSb is configured such that a tip signal TIP (first unit signal) and a ring signal RING (second unit signal) are alternately arranged a total of eight times during a transmission interval UpIntv of the uplink signal US. When the duration of one tip signal TIP and the duration of one ring signal RING are both T1, UpIntv=16×T1.

Figure 6B:
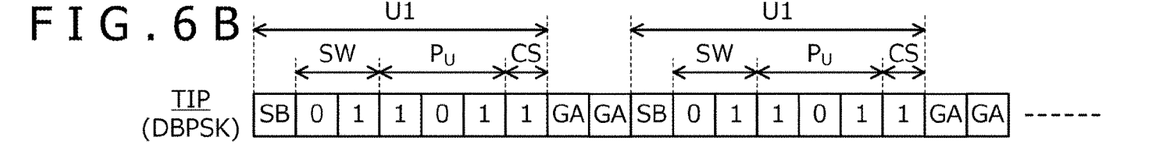
FIGS. 6B and 6C are diagrams illustrating a configuration of a tip signal and a configuration of a ring signal in a case where the downlink signal is modulated by differential binary phase-shift keying (DBPSK)
Figure 6C:
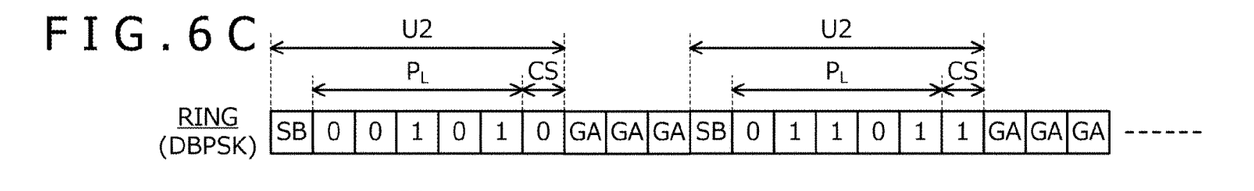
Figure 6D:
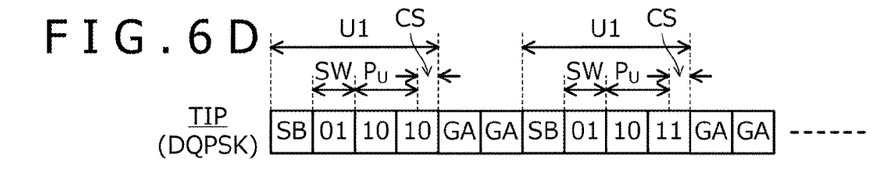
FIGS. 6D and 6E are diagrams illustrating a configuration of the tip signal and a configuration of the ring signal in a case where the downlink signal is modulated by differential quadrature phase-shift keying (DQPSK)
Figure 6E:
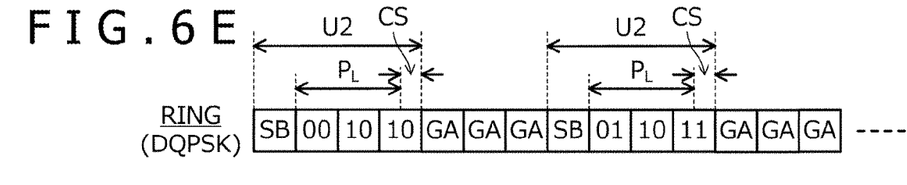

FIGS. 6B and 6C are diagrams respectively illustrating a configuration of the tip signal TIP and a configuration of the ring signal RING in a case where the downlink signal DSb is modulated by DBPSK. Further, FIGS. 6D and 6E are diagrams respectively illustrating a configuration of the tip signal TIP and a configuration of the ring signal RING in a case where the downlink signal DSb is modulated by DQPSK. As depicted in FIGS. 6B, 6C, 6D, and 6E, the tip signal TIP is formed by repeating a unit signal U1, and the ring signal RING is formed by repeating a unit signal U2. Further, the tip signal TIP is configured such that a gap GA (a period of time during which no signal is transmitted) of two symbols is provided between two temporally adjacent unit signals U1. Meanwhile, the ring signal RING is configured such that a gap GA of three symbols is provided between two temporally adjacent unit signals U2.

As depicted in FIGS. 6B, 6C, 6D, and 6E, the unit signals U1 and U2 each include a start bit SB of one symbol and 6 bits of data. The unit signals U1 and U2 are both configured such that the number of symbols of the data is six in a case where the downlink signal DSb is modulated by DBPSK and three in a case where the downlink signal DSb is modulated by DQPSK. The unit signals U1 and U2 differ in terms of the content of the data. The data in the unit signal U1 includes 2-bit switch information SW indicating the operating status (on or off state) of the side switch 24 depicted in FIG. 1, three higher-order bits of data $P_U$ of a 12-bit pen pressure value indicating the pressure detected by the pressure sensor 23 depicted in FIG. 1, and a 1-bit checksum CS. Meanwhile, the data in the unit signal U2 includes a 1-bit checksum CS and 5-bit data $P_L$ that is obtained by removing the three most significant bits (that is, the data $P_U$ transmitted by the tip signal TIP) from the eight higher-order bits of the 12-bit pen pressure value indicating the pressure detected by the pressure sensor 23 depicted in FIG. 1.

The relation between the durations of the time slots and the durations of the unit signals U1 and U2 will now be described with reference to specific examples. A first example relates to a case where the downlink signal DSb is modulated by DBPSK. When it is assumed that one symbol includes two waves (a two-cycle carrier wave), the durations of the unit signals U1 and U2 are both 7×2 waves=14 waves. Further, the frequency of the carrier wave is, for example, 114 kHz, and the minimum duration of one time slot is 175 pec according to the standard for the active pen 2 in a case where the downlink signal DSb is modulated by DBPSK. Therefore, when expressed by the number of waves of the carrier wave, the duration of a time slot is 175 pec/(1/114 kHz)=19.95 waves. Consequently, according to the configurations of the unit signals U1 and U2 depicted in FIGS. 6B and 6C, it can be said that the unit signals U1 and U2 are implemented to be shorter in duration than the time slots.

A second example relates to a case where the downlink signal DSb is modulated by DQPSK. When it is assumed that one symbol includes two waves (a two-cycle carrier wave), the durations of the unit signals U1 and U2 are both 4×2 waves=8 waves. Further, the frequency of the carrier wave is, for example, 114 kHz, and the minimum duration of one time slot is 105 pec according to the standard for the active pen 2 in a case where the downlink signal DSb is modulated by DQPSK. Therefore, when expressed by the number of waves of the carrier wave, the duration of a time slot is 105 pec/(1/114 kHz)=11.97 waves. Consequently, according to the configurations of the unit signals U1 and U2 depicted in FIGS. 6D and 6E, it can be said that the unit signals U1 and U2 are implemented to be shorter in duration than the time slots.

Referring again to FIG. 6A, each of the tip signal TIP and the ring signal RING includes a portion of the pen pressure values P1-P4, which are updated four times during the transmission interval Upintv. More specifically, as depicted in FIG. 6A, new pen pressure values P1 to P4 are sequentially supplied from the pressure sensor 23 to the integrated circuit 26 at time intervals of 4×T1, and the supplied pen pressure values are partially arranged in both the tip signal TIP and the ring signal RING. Consequently, even in a case where the downlink signal DSb is transmitted, pen pressure value transmission is achieved with nearly the same high resolution as that in the case of the transmission of the downlink signal DSa.

Figure 7:
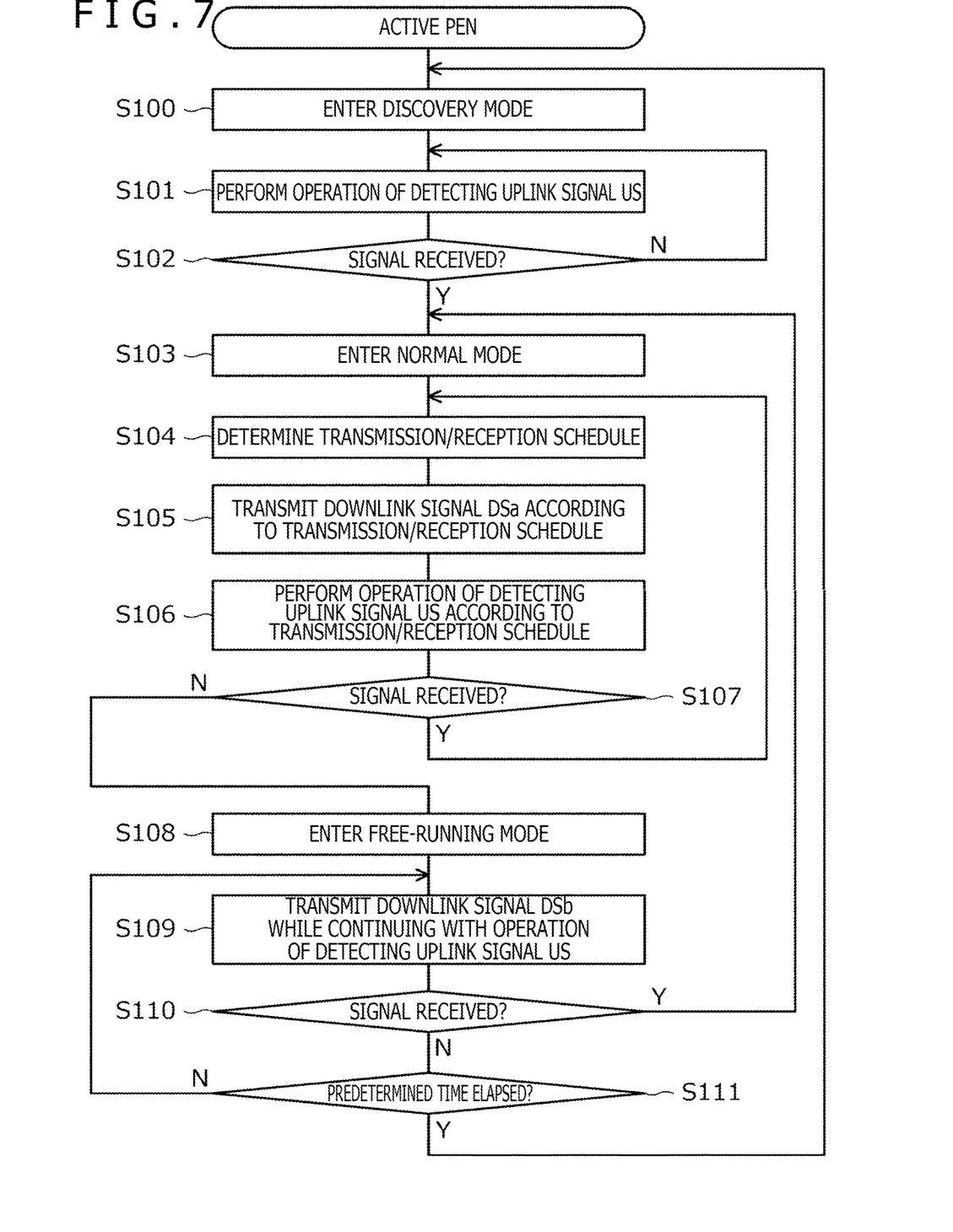
FIG. 7 is a flowchart illustrating a process performed by the processing circuit depicted in FIG. 1.

FIG. 7 is a flowchart illustrating a process performed by the processing circuit 26d depicted in FIG. 1. As depicted in FIG. 7, the processing circuit 26d first enters the discovery mode (step S100). Next, the processing circuit 26d causes the reception circuit 26c to perform an operation of detecting the uplink signal US (step S101). Then, as the result of such a detection operation, the processing circuit 26d determines whether or not the uplink signal US is received (step S102). Upon determining that the uplink signal US is not received, the processing circuit 26d repeats steps S101 and subsequent steps. Meanwhile, upon determining that the uplink signal US is received, the processing circuit 26d enters the normal mode (step S103), and determines a transmission/reception schedule for the downlink signal DS and the uplink signal US based on the reception timing of the received uplink signal US used as the reference time (step S104). The transmission/reception schedule determined in the above manner includes the temporal positions of the series of time slots used for transmitting the downlink signal DS and the temporal position of the timing for an operation of detecting the next uplink signal US.

Next, the processing circuit 26d generates, within each time slot, the downlink signal DSa, according to a command in the uplink signal US, and causes the transmission circuit 26b to transmit the generated downlink signal DSa by using a time within the series of time slots determined in step S104 (step S105). Further, according to the transmission/reception schedule determined in step S104, the processing circuit 26d causes the reception circuit 26c to perform an operation of detecting the next uplink signal US (step S106).

Next, as the result of step S106, the processing circuit 26d determines whether or not the uplink signal US is received (step S107). Upon determining that the uplink signal US is received, the processing circuit 26d returns to step S104 and repeats the processing. Meanwhile, upon determining that the uplink signal US is not received, the processing circuit 26d enters the free-running mode (step S108).

Upon entering the free-running mode, the processing circuit 26d causes the transmission circuit 26b to transmit the downlink signal DSb while allowing the reception circuit 26c to continue with the operation of detecting the uplink signal US (step S109). As described earlier, the transmission circuit 26b transmits the downlink signal DSb by using both a time within the series of time slots TS and a time outside the series of time slots TS.

Upon completion of step S109, the processing circuit 26d determines whether or not the uplink signal US is received (step S110). If the result of determination indicates that the uplink signal US is not received, the processing circuit 26d further determines whether or not a predetermined time has elapsed after the entry into the free-running mode (step S111). If the predetermined time has not elapsed, the processing circuit 26d returns to step S109 and continues with transmission/reception processing. Meanwhile, if the result of determination in step S110 indicates that the uplink signal US is received, the processing circuit 26d returns to step S103 and enters again the normal mode to continue with the processing. Further, if it is determined in step S111 that the predetermined time has elapsed, the processing circuit 26d returns to step S103 and enters again the discovery mode to continue with the processing.

Figure 8:
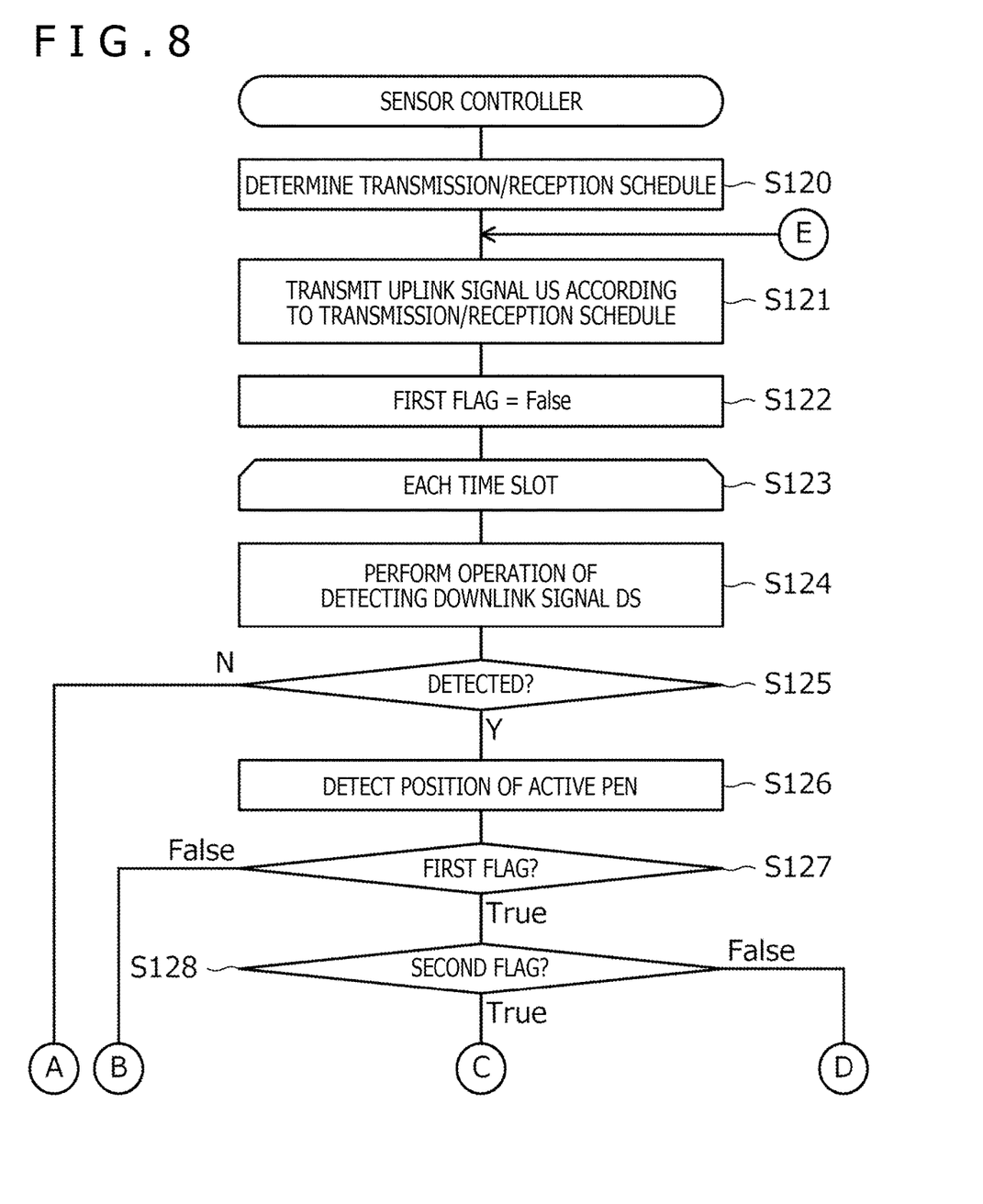
FIG. 8 is a flowchart illustrating a process performed by the sensor controller depicted in FIG. 1.
Figure 9:
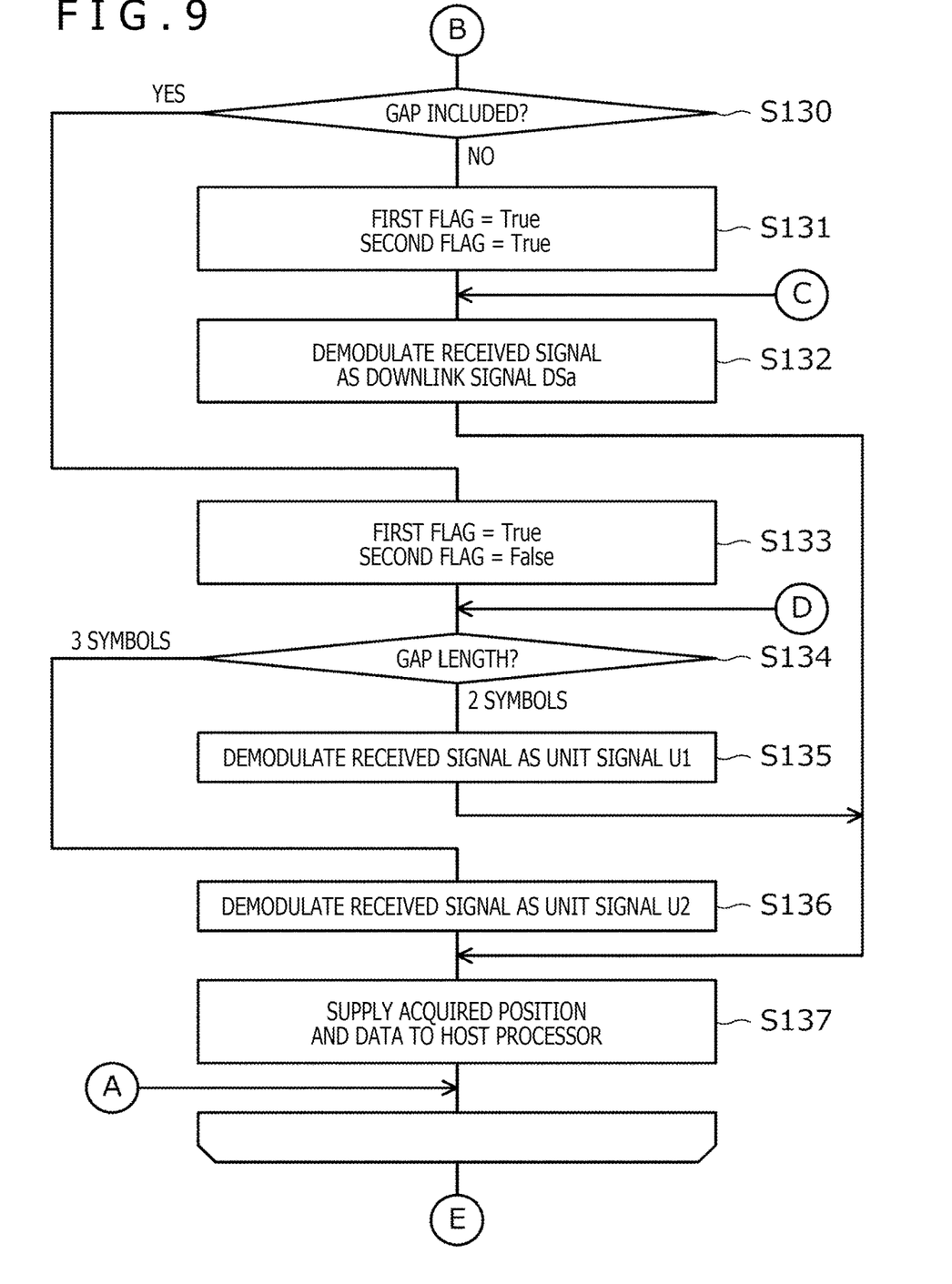
FIG. 9 is a flowchart illustrating the process performed by the sensor controller depicted in FIG. 1.

FIGS. 8 and 9 are flowcharts illustrating a process performed by the sensor controller 31. As depicted in FIGS. 8 and 9, the sensor controller 31 first determines a transmission/reception schedule for the uplink signal US and downlink signal DS (step S120). This determination is made based on information regarding the pixel drive intervals in the display 32 that is acquired from the host processor 33 depicted in FIG. 1. The determined transmission/reception schedule includes the initial transmission timing and transmission interval (the interval Upintv depicted in, for example, FIG. 4) of the uplink signal US and the temporal positions of the series of time slots used for receiving the downlink signal DS.

Next, the sensor controller 31 transmits the uplink signal US, according to the transmission/reception schedule determined in step S120 (step S121), and then sets a first flag, which indicates whether or not the type of the downlink signal DS has already been determined, to a value (=False) indicating that the type of the downlink signal DS has not been determined yet (step S122).

Next, the sensor controller 31 performs steps S124 to S137 within each time slot determined in step S120 (step S123). More specifically, the sensor controller 31 first performs an operation of detecting the downlink signal DS by detecting a change in the potentials of the plurality of sensor electrodes 30x and 30y depicted in FIG. 2 (step S124). Then, the sensor controller 31 determines whether or not the downlink signal DS is detected (step S125). If it is determined that the downlink signal DS is detected, the sensor controller 31 detects the position of the active pen 2 on the basis of the result of the detection (step S126). Meanwhile, if it is determined that the downlink signal DS is not detected, the sensor controller 31 waits until the next time slot and repeats steps S124 and subsequent steps.

Upon completion of step S126, the sensor controller 31 refers to the value of the first flag (step S127). If the value is True, the sensor controller 31 proceeds to step S128. Meanwhile, if the value is False, the sensor controller 31 proceeds to step S130. In step S128, the sensor controller 31 refers to the value of a second flag which indicates the type of the downlink signal DS (step S127). If the value indicates the type is the downlink signal DSa (=True), the sensor controller 31 proceeds to step S132. Meanwhile, if the value indicates the type is the downlink signal DSb (=False), the sensor controller 31 proceeds to step S134.

In step S130, the sensor controller 31 determines whether or not a gap GA depicted in FIGS. 6B to 6E is included in the detected downlink signal DS (step S130). If the result of determination indicates that no gap GA is included, the sensor controller 31 sets the first and second flags to True (step S131), and then regards the received signal as the downlink signal DSa and demodulates the received signal (step S132).

Meanwhile, if the result of determination in step S130 indicates that a gap GA is included, the sensor controller 31 sets the first flag to True and sets the second flag to False (step S133), and then determines the length of the detected gap GA (step S134). If the result of determination indicates that the length of the detected gap GA is equivalent to two symbols, the sensor controller 31 regards the received signal as the unit signal U1 and demodulates the received signal (step S135). Meanwhile, if the result of determination indicates that the length of the detected gap GA is equivalent to three symbols, the sensor controller 31 regards the received signal as the unit signal U2 and demodulates the received signal (step S136). It should be noted that, when performing a demodulation process in step S135 or S136, it is sufficient if the sensor controller 31 acquires the reception timing of the unit signals U1 and U2 on the basis of the position of the gap GA.

Upon completion of step S132, S135, or S136, the sensor controller 31 supplies, to the host processor 33, the position detected in step S126 and the data derived from demodulation in step S132, S135, or S136 (step S137). Subsequently, the sensor controller 31 waits until the next time slot and repeats steps S124 and subsequent steps. Upon completion of processing within each time slot, the sensor controller 31 returns to step S121 and transmits the uplink signal US.

As described above, even if the active pen 2 is unable to know the temporal positions of the time slots due to a failure to receive the uplink signal US, the position detection system 1 according to the present embodiment enables the active pen 2 to continuously transmit the downlink signal DS. This prevents a situation where drawing based on pen input is stopped even when a failure to receive the uplink signal US may occur.

Further, the pen pressure values arranged partially in both the tip signal TIP and the ring signal RING are updated four times during the transmission interval Upintv. Therefore, even in a case where the active pen 2 transmits the downlink signal DSb, pen pressure value transmission is achieved with nearly the same high resolution as that in the case of the transmission of the downlink signal DSa.

Figure 10:
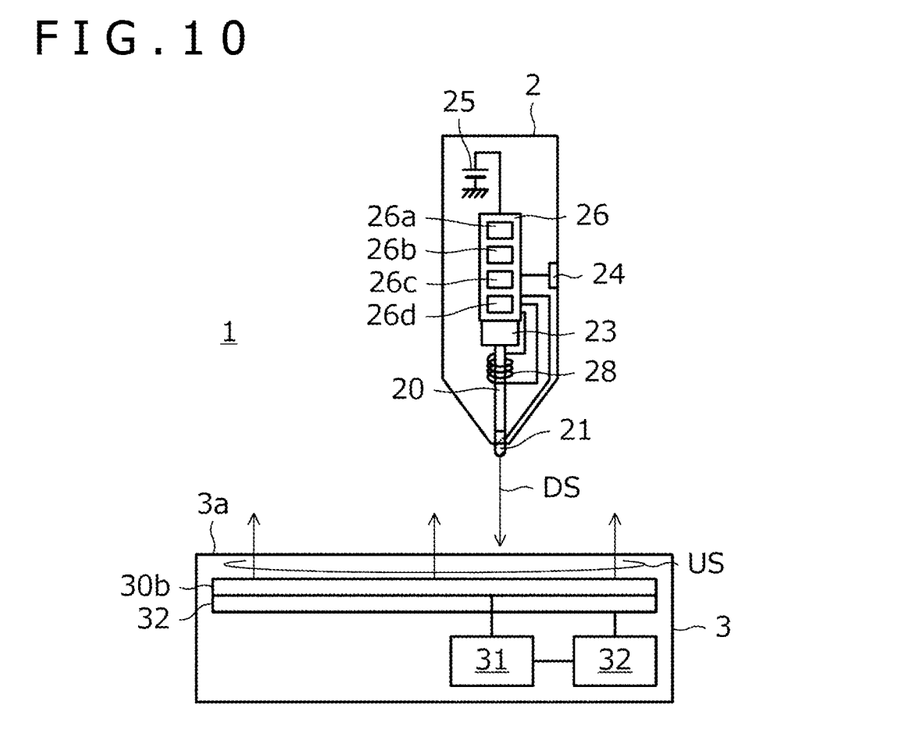
FIG. 10 is a diagram illustrating a configuration of the position detection system according to a second embodiment of the present disclosure.

FIG. 10 is a diagram illustrating a configuration of the position detection system 1 according to a second embodiment of the present disclosure. As depicted in FIG. 10, the position detection system 1 according to the second embodiment differs from the position detection system 1 according to the first embodiment in that the second embodiment transmits and receives the uplink signal US by using an electromagnetic induction method instead of the capacitive coupling method. Further, in terms of a specific configuration, the position detection system 1 according to the second embodiment differs from the position detection system 1 according to the first embodiment in that the second embodiment includes the active pen 2 having a coil 28, instead of the ring electrode 22 and the stop filter 27, and the electronic apparatus 3 having a sensor 30b, instead of the sensor 30a. In the other respects, the position detection system 1 according to the second embodiment is similar to the position detection system 1 according to the first embodiment. Therefore, the position detection system 1 according to the second embodiment is described below with focus placed on the above-mentioned differences.

Figure 11:
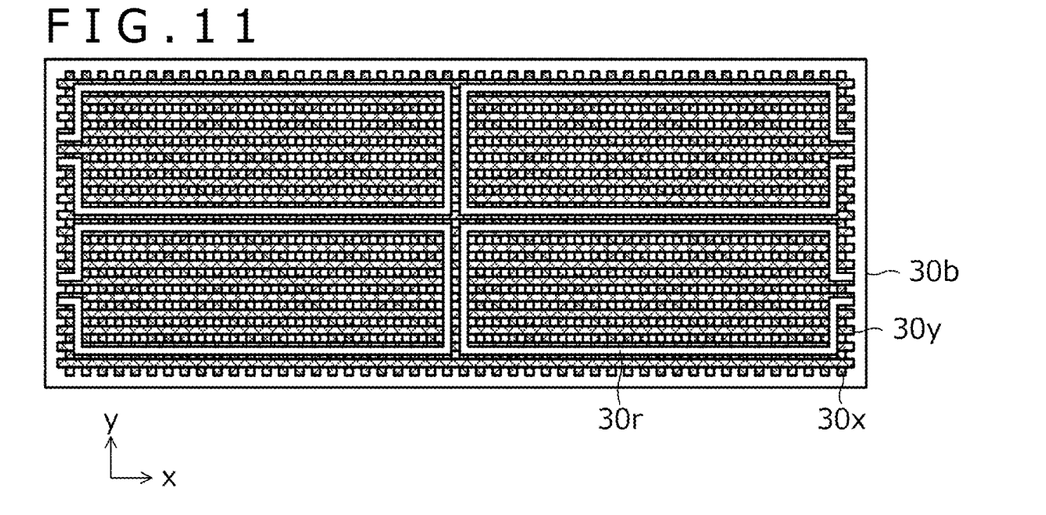
FIG. 11 is a plan view of a sensor depicted in FIG. 10.

FIG. 11 is a plan view of the sensor 30b. The plurality of sensor electrodes 30x and 30y depicted in FIG. 11 are the same as those included in the sensor 30a which has been described in conjunction with the first embodiment. The sensor 30b is characterized in that it includes one or more loop coils 30r in addition to the plurality of sensor electrodes 30x and 30y. The sensor controller 31 supplies the uplink signal US to the active pen 2 by supplying the uplink signal US to each of the one or more loop coils 30r. In other words, the sensor controller 31 according to the second embodiment transmits the uplink signal US by using a magnetic field generated from each loop coil 30r.

Here, it is sufficient if the specific layout of the one or more loop coils 30r is configured so as to enable the active pen 2 to receive the uplink signal US no matter where in the touch surface 3a the active pen 2 is positioned. For example, as depicted in FIG. 11, it is sufficient if four loop coils 30r is used and arranged in such a manner as to be extended along the sides of four areas obtained by dividing the touch surface 3a into the four areas arranged in a 2×2 matrix form.

Returning to FIG. 10, the reception circuit 26c according to the present embodiment detects an induced current generated in the coil 28, to detect the uplink signal US transmitted from the sensor controller 31 through the one or more loop coils 30r. In other words, the active pen 2 according to the present embodiment detects the uplink signal US by using the coil 28 to detect the magnetic field generated from each loop coil 30r.

As described above, the position detection system 1 according to the present embodiment is able to transmit the uplink signal US by using the electromagnetic induction method which is less susceptible to noise than the capacitive coupling method. This prevents a situation where drawing based on pen input is stopped due to a failure by the active pen 2 to receive the uplink signal US.

It should be noted that the position detection system 1 according to the present embodiment significantly reduces the possibility of the active pen 2 failing to receive the uplink signal US. This means that the downlink signal DSb described in conjunction with the first embodiment need not necessarily be used. Therefore, the position detection system 1 according to the present embodiment may use only the downlink signal DSa without additionally using the downlink signal DSb. However, it is obvious that the position detection system 1 according to the present embodiment may use the downlink signal DSb as is the case with the position detection system 1 according to the first embodiment.

While the preferred embodiments of the present disclosure have been described above, the present disclosure is not limited to such foregoing embodiments. Persons of skill in the art will appreciate that various modifications may be made without departing from the scope of the present disclosure.

For example, the foregoing embodiments assume that the length of the gap GA in the tip signal TIP is equivalent to two symbols and that the length of the gap GA in the ring signal RING is equivalent to three symbols. However, it is merely necessary that the tip signal TIP and the ring signal RING differ in the length of the gap GA. The length of the gap GA is not specifically limited to two symbols or three symbols.

Further, the foregoing embodiments have been described with reference to the example where the pen pressure value is transmitted four times during one transmission interval UpIntv of the uplink signal US. However, the number of times the pen pressure value is transmitted is not limited to four. The pen pressure value may be transmitted only once or transmitted two or more times.

Furthermore, the foregoing embodiments have been described on the assumption that the present disclosure is applied to an in-cell position detection device. However, the present disclosure can also be suitable applied to an on-cell position detection device and an out-cell position detection device. If, in such cases, the information regarding the pixel drive intervals in the display 32 can be acquired from the host processor 33, the sensor controller 31 may use the acquired information to determine the transmission/reception schedule for the uplink signal US and the downlink signal DS, as is the case with the foregoing embodiments. Meanwhile, if the information regarding the pixel drive intervals in the display 32 cannot be acquired from the host processor 33, the sensor controller 31 may acquire the information by measuring noise generated from the display 32 and may use the acquired information to determine the transmission/reception schedule for the uplink signal US and the downlink signal DS.

The invention claimed is:

1. An active pen, comprising:
a housing, and
an integrated circuit enclosed in the housing and configured to control operation of the active pen to communicate with a sensor controller by using a series of time slots, to receive uplink signals from the sensor controller and to transmit downlink signals to the sensor controller,
wherein the series of time slots are determined based on a reception timing, by the active pen, of one of the uplink signals transmitted from the sensor controller,
wherein the integrated circuit, in operation,
determines whether or not one of the uplink signals is received,
responsive to a determination that the uplink signal is not received, controls the active pen to transmit a first downlink signal by using a time within the series of time slots, and
responsive to a determination that the uplink signal is not received, controls the active pen to transmit a second downlink signal by using both a time within the series of time slots and a time outside the series of time slots, the second downlink signal being formed by repeating a unit signal that is shorter in duration than each of the series of time slots.

2. The active pen according to claim 1,
wherein the second downlink signal includes a first unit signal and a second unit signal, the first unit signal and the second unit signal each includes a gap, the gap included in the first unit signal is different in length from the gap included in the second unit signal, and the gaps are each arranged between two temporally adjacent unit signals.

3. The active pen according to claim 2, comprising:
a pressure sensor that acquires a pen pressure value having a first number of bits based on a detection of a pressure applied to a pen tip,
wherein,
the first downlink signal includes a signal modulated by the pen pressure value,
the first unit signal includes a signal modulated by some of a predetermined number of high-order bits of the pen pressure value, and
the second unit signal includes a signal modulated by the rest of the predetermined number of high-order bits of the pen pressure value.

4. The active pen according to claim 3,
wherein the pen pressure value arranged partially in each of the first and second unit signals is updated at least two times during one transmission interval of the uplink signal.

5. The active pen according to claim 1,
wherein the active pen performs an operation of detecting the uplink signal in parallel with the transmission of the second downlink signal.

6. The active pen according to claim 5, comprising:
a first electrode and a second electrode that are different from each other;
a transmission circuit that transmits the first downlink signal and the second downlink signal by changing a potential of the first electrode;
a reception circuit that receives the uplink signal by detecting a change in a potential of the second electrode; and
a stop filter that blocks a change in the potential of the first electrode from affecting the potential of the uplink signal received by the reception circuit.

7. The active pen according to claim 5, comprising:
an electrode and a coil;
a transmission circuit that transmits the first downlink signal and the second downlink signal by changing a potential of the electrode; and
a reception circuit that receives the uplink signal by detecting an induced current generated in the coil.

* * * * *

UNITED STATES PATENT AND TRADEMARK OFFICE
CERTIFICATE OF CORRECTION

| | |
|---|---|
| PATENT NO. | : 11,740,730 B2 |
| APPLICATION NO. | : 17/696659 |
| DATED | : August 29, 2023 |
| INVENTOR(S) | : Masayuki Miyamoto |

It is certified that error appears in the above-identified patent and that said Letters Patent is hereby corrected as shown below:

In the Claims

Column 14, Claim 1, Line 2:
"not received, controls the active pen to transmit a"
Should read:
--received, controls the active pen to transmit a--.

Signed and Sealed this
Twentieth Day of August, 2024

Katherine Kelly Vidal
*Director of the United States Patent and Trademark Office*